US008289279B2

(12) United States Patent
Kirtley et al.

(10) Patent No.: US 8,289,279 B2
(45) **Date of Patent: *Oct. 16, 2012**

(54) ULTRA KEYBOARD SYSTEM

(76) Inventors: Donny Kevin Kirtley, Lufkin, TX (US); Pamela Kay Kirtley, Lufkin, TX (US)

( * ) Notice: Subject to any disclaimer, the term of this patent is extended or adjusted under 35 U.S.C. 154(b) by 1757 days.

This patent is subject to a terminal disclaimer.

(21) Appl. No.: 10/961,328

(22) Filed: Oct. 8, 2004

(65) Prior Publication Data

US 2006/0077180 A1 Apr. 13, 2006

(51) Int. Cl.
*G06F 3/02* (2006.01)
*G09G 5/00* (2006.01)

(52) U.S. Cl. .......... 345/168

(58) Field of Classification Search .......... 345/163, 345/168, 172

See application file for complete search history.

(56) References Cited

U.S. PATENT DOCUMENTS

| | | | | |
|---|---|---|---|---|
| 5,281,958 | A * | 1/1994 | Ashmun et al. | 345/157 |
| 5,432,530 | A * | 7/1995 | Arita et al. | 345/159 |
| 5,504,502 | A * | 4/1996 | Arita et al. | 345/160 |
| 5,717,428 | A * | 2/1998 | Barrus et al. | 345/168 |
| 6,114,977 | A * | 9/2000 | Smith et al. | 341/22 |
| 6,219,036 | B1 * | 4/2001 | Urita | 345/161 |
| 6,556,150 | B1 * | 4/2003 | McLoone et al. | 341/20 |
| 6,633,930 | B2 * | 10/2003 | Sonehara et al. | 710/62 |
| 2003/0043119 | A1 * | 3/2003 | Hatanaka | 345/168 |
| 2003/0206759 | A1 * | 11/2003 | Emerson | 400/472 |
| 2004/0075640 | A1 * | 4/2004 | Liao | 345/156 |
| 2006/0012573 | A1 * | 1/2006 | Homer et al. | 345/168 |
| 2006/0017698 | A1 * | 1/2006 | Hull et al. | 345/168 |

* cited by examiner

*Primary Examiner* — Bipin Shalwala
*Assistant Examiner* — Steven Holton
(74) *Attorney, Agent, or Firm* — Delphine James

(57) ABSTRACT

The present invention provides a wireless keyboard system for a digital computer. The keyboard system further comprises a housing having a keyboard section, function key section, and numeric key section cooperatively arranged on the top surface area of the housing. The keyboard section has keys for generating key signals. The keys of the keyboard section are substantially arranged in a standard QWERTY or DVORAK typewriting key format. The function key section has keys configured to generate application or system specific key signals. The numeric key section has keys configured to generate numeric key signals. The keyboard system further comprises a switch configured to switch the numeric key section between a keyboard mode and a calculator mode. A small display is operationally mounted on the top surface of the housing near the numeric key section. The display is operational within the calculator mode. A wireless communication means is required for transmitting the key signals of each section to the digital computer. The keyboard system can further comprise a ergonomic integrated pointing device.

27 Claims, 9 Drawing Sheets

ULTRA KEYBOARD SYSTEM

BACKGROUND

The present invention relates to keyboards for desktop computers. Conventional computer keyboards normally have a conventional QWERTY keyboard layout along with function keys and a numeric keypad. The function keys generate short fixed sequences for character codes that instruct application programs running on the computer to perform certain actions. The numeric keypad normally has keys for entering numeric and arithmetic data as well as directional buttons for moving the screen cursor. No standard currently exist for the placement of the function keys or the numeric keypad.

In some prior art devices, pointing devices such as the mouse is integrated into the keyboard as track balls. Some inventions in the prior art discloses a more ergonomic keyboard and mouse combination. For example, U.S. Pat. No. 5,936,555 discloses on such keyboard and pointing system combination.

A standard calculator has a rectangular shape with a key pad for entering numeric and arithmetic data. Calculator programs are common accessories included with most computer operating systems. However, the use of the computer calculator programs is awkward.

The present invention discloses an ergonomic integrated keyboard, pointing system and calculator system that is novel.

SUMMARY

The present invention provides a wireless keyboard system for a digital computer. The keyboard system further comprises a housing having a keyboard section, function key section, and numeric key section cooperatively arranged on the top surface area of the housing. The keyboard section has keys for generating key signals. The keys of the keyboard section are substantially arranged in a standard QWERTY or DVORAK typewriting key format. The function key section has keys configured to generate application or system specific key signals. The numeric key section has keys configured to generate numeric key signals. The keyboard system further comprises a switch configured to switch the numeric key section between a keyboard mode and a calculator mode. A small display is operationally mounted on the top surface of the housing near the numeric key section. The display is operational within the calculator mode. A wire or wireless communication means can be used for transmitting the key signals of each section to the digital computer. The keyboard system can further comprise a ergonomic integrated pointing device or mouse which is specifically design to the natural position of the hand while operating the mouse.

DETAILED SPECIFICATION

Figure 1:
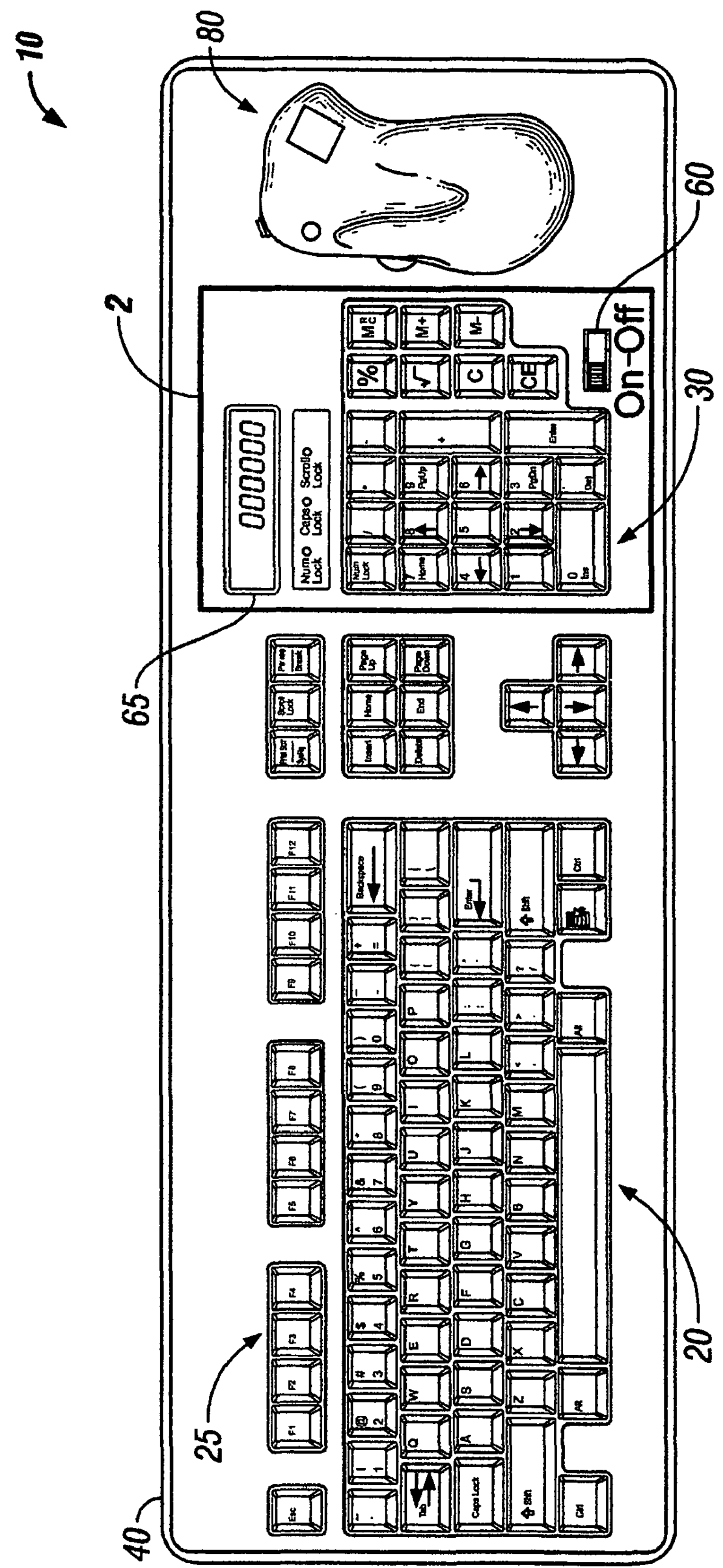
FIG. 1 is top perspective view of the keyboard system.

Referring to FIG. 1, there is shown a top perspective view of the present invention, a wireless keyboard system (10) for a digital computer. The keyboard system (10) further comprises a housing (40) having a keyboard section (20), function key section (25), and numeric key section (30) which are cooperatively arranged on the top surface area of the housing (40).

As illustrated in FIG. 1, the keyboard section (20) is substantially arranged in a standard QWERTY or DVORAK typewriting key format. The QWERTY is the standard format that most people are accustomed to. Each key when depressed generates standard key signals which are numeric codes. The numeric codes are transmitted to the keyboard driver software and then to the digital computer operating system software.

Figure 1A:
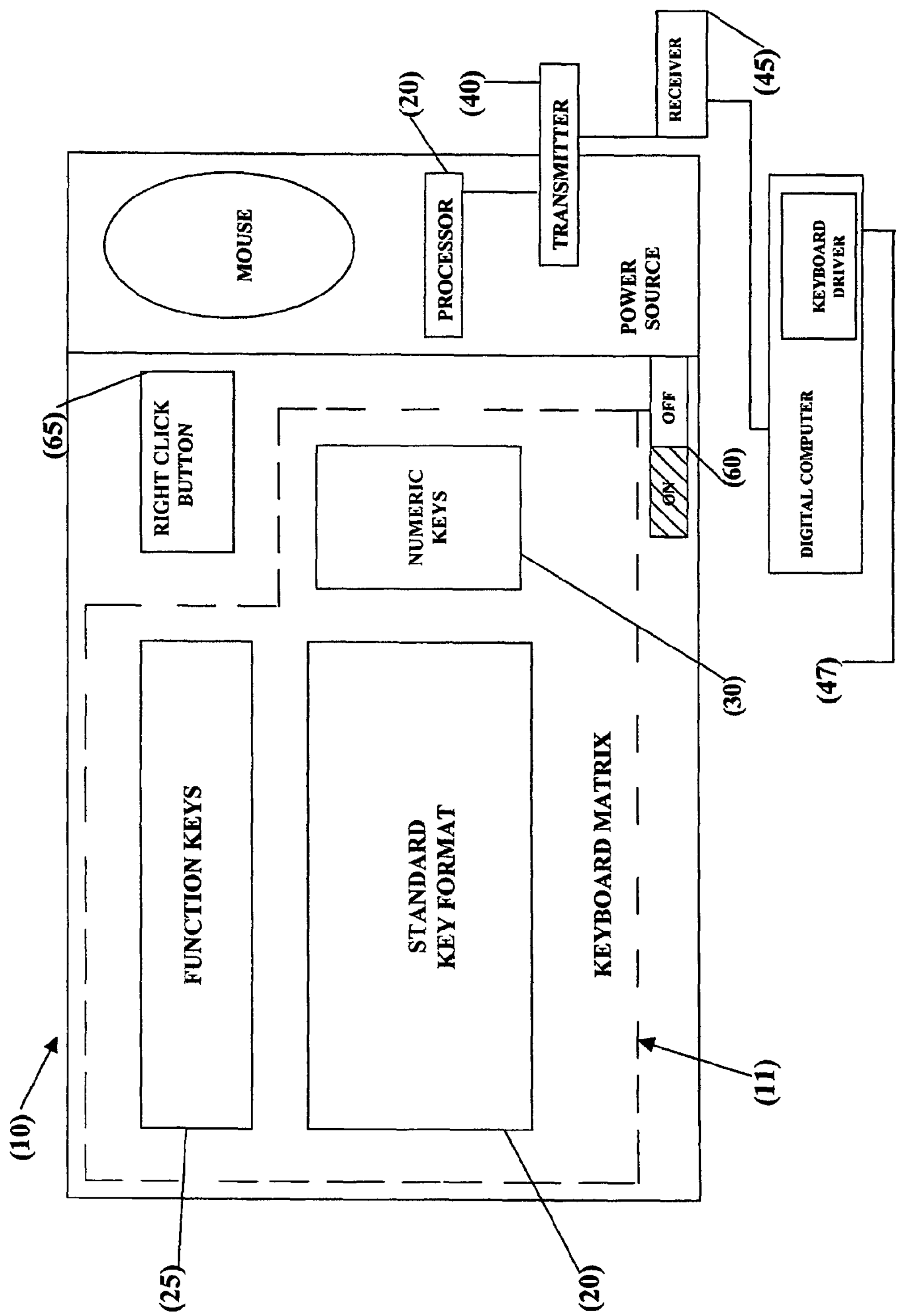
FIG. 1A illustrates an embodiment of an internal configuration of the keyboard system of the present invention.

Referring to FIG. 1A there is shown an illustration of one embodiment of the internal keyboard system (10) configuration. The keys of the keyboard system (10) are connected up as key matrix (11). Key matrix (11) supports the keyboard (20), function key (25), and numeric key (30) sections of the keyboard system. When a key in the matrix (11) is depressed, the row and the column of the depressed key generate a unique signal to processor (12). Key matrix (11) is a grid of circuits. Generally, a broken circuit is positioned underneath each key button. When a key is pressed, for example the button “Q”, the circuit below the depressed key “Q” becomes connected. Upon connection of the circuit underneath the letter, “Q”, a tiny amount of current flows through the circuit. When the “Q” key is released, the circuit underneath the letter “Q” is broken again.

Processor (12) has the capability of continuously monitoring the flow of current in the key matrix (11). When processor (12) notices a key current flow, the location of the key is determined. Then, the appropriate numeric code corresponding to the key signal is transmitted to the digital computer.

The function key section (25) has keys configured to generate application or system specific key signals. The function key section (25) includes function keys and control keys. Function keys are arranged in a line across the top of the keyboard and can be assigned specific commands by system and application programs executing in the digital computer. The function key section (25) includes control keys which are normally located between the keyboard section (20) and the numeric section (30). Control keys can provide cursor and screen control. The common control keys include HOME, END, INSERT, DELETE, PAGE UP, PAGE DOWN, CONTROL, and ESCAPE.

As illustrated in FIG. 1, numeric key section (30) is located to the right of the keyboard section (20) and is a separate key pad for entering arithmetic and numeric data. The keypad is normally used for speedy data entry. Thus, the numeric key pad (30) is laid out in the same configuration as traditional calculators or adding machines. Additionally, special function keys (23) can be generated. These function keys provide additional specific calculator functions such as percent, square root, and memory keys.

Figure 2:
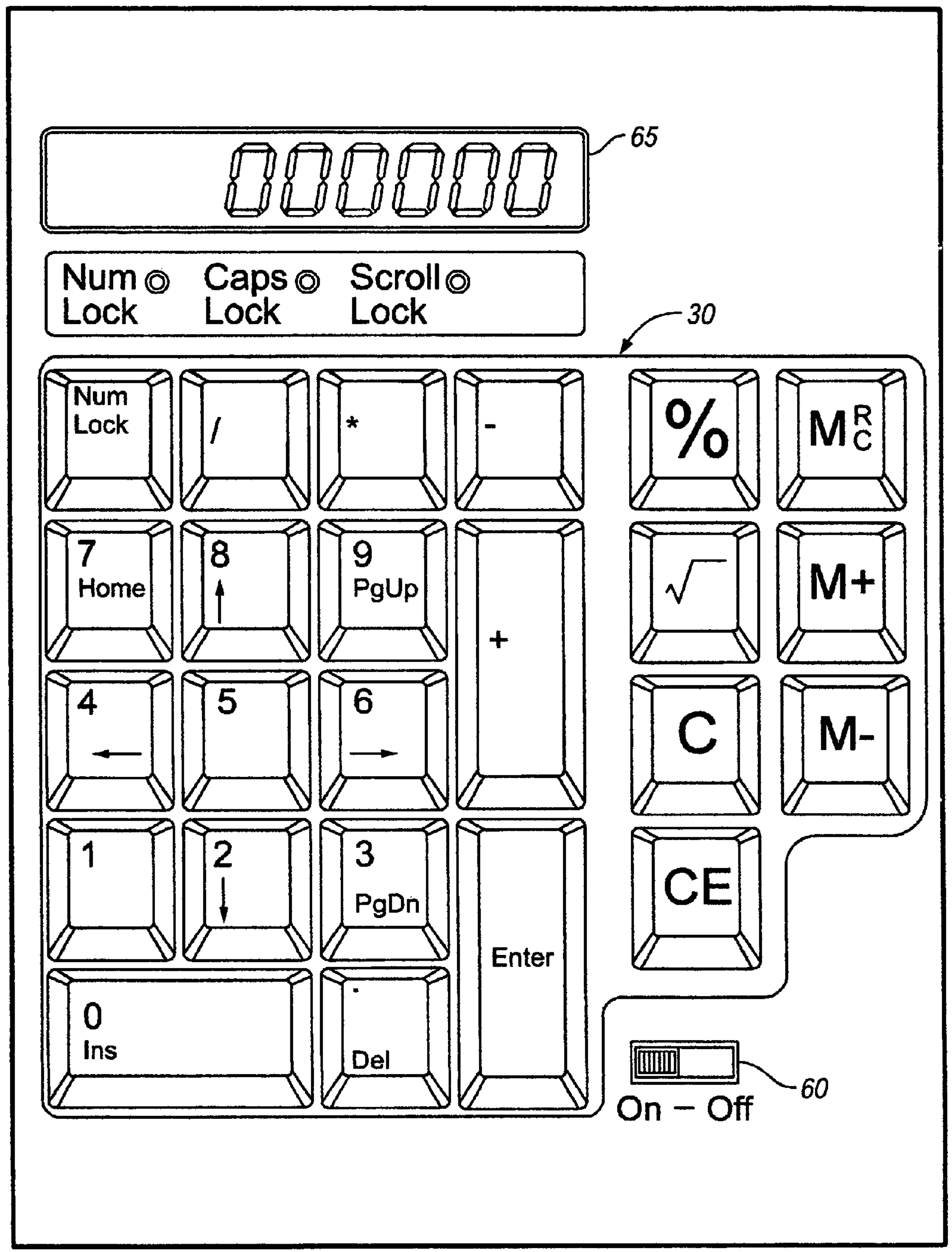
FIG. 2 is an exploded view of the numeric key section of the keyboard system.

As illustrated in FIG. 2, keyboard system (10) further comprises a switch (60) configured to switch the numeric keypad section (30) between a keyboard mode and a calculator mode. A small display (65) is operationally mounted on the top surface of the housing (10) near the numeric key section (30). Display (65) is only operational within the calculator mode. When numeric keypad section (30) is not operational in calculator mode, display (65) operates as a clock. The display (65) can be a flat LED display panel, a flat LCD display panel or another suitable flat display. Additionally, in other embodiments, display (65) can operationally be connected in a raised angled position. The display panel can be operationally connected to the top surface area of housing (40) in at least a 15 degree angle. In even more specific embodiments, the display panel (65) can further comprise a cover hingedly connected to the upper edge of the display panel (65) such that the cover can flip between an opened and closed position.

When switch (60) is in calculator mode, processor (12) detects the mode and transmits all key presses to a calculator driver firmware. The calculator driver processes the key strokes and displays the information onto the display (65).

Referring to FIG. 1A, a wireless communication means can be used for transmitting the key signals of each section of keyboard system (10) to the digital computer. The wireless communication means can further comprise a transmitter (40) and receiver (45). The transmitter (40) is incorporated into keyboard system (10). Transmitter (40) sends the key signals to the receiver (45) which can be connected to the digital computer through a standard communication port such as USB port. At the other end of the receiver (45) is a keyboard driver (47) or controller. The keyboard driver (47) job is to process all data that comes from the keyboard system (20) and forward the data to the operating system of the digital computer. Transmitter (40) and receiver (45) can communicate utilizing radio signals, infrared technology or any other such compatible technology. In other embodiments, standard wired communications means can be used to operationally connect the keyboard system (10) to the digital computer.

The keyboard system (10) further comprises a power source for generating electric current to support the system. For the wireless keyboard, the power source can be conventional batteries, solar power cells or another such power source. The batteries can be implemented as rechargeable. However, for the wired communication means, standard electrical power can be used.

Figure 1B:
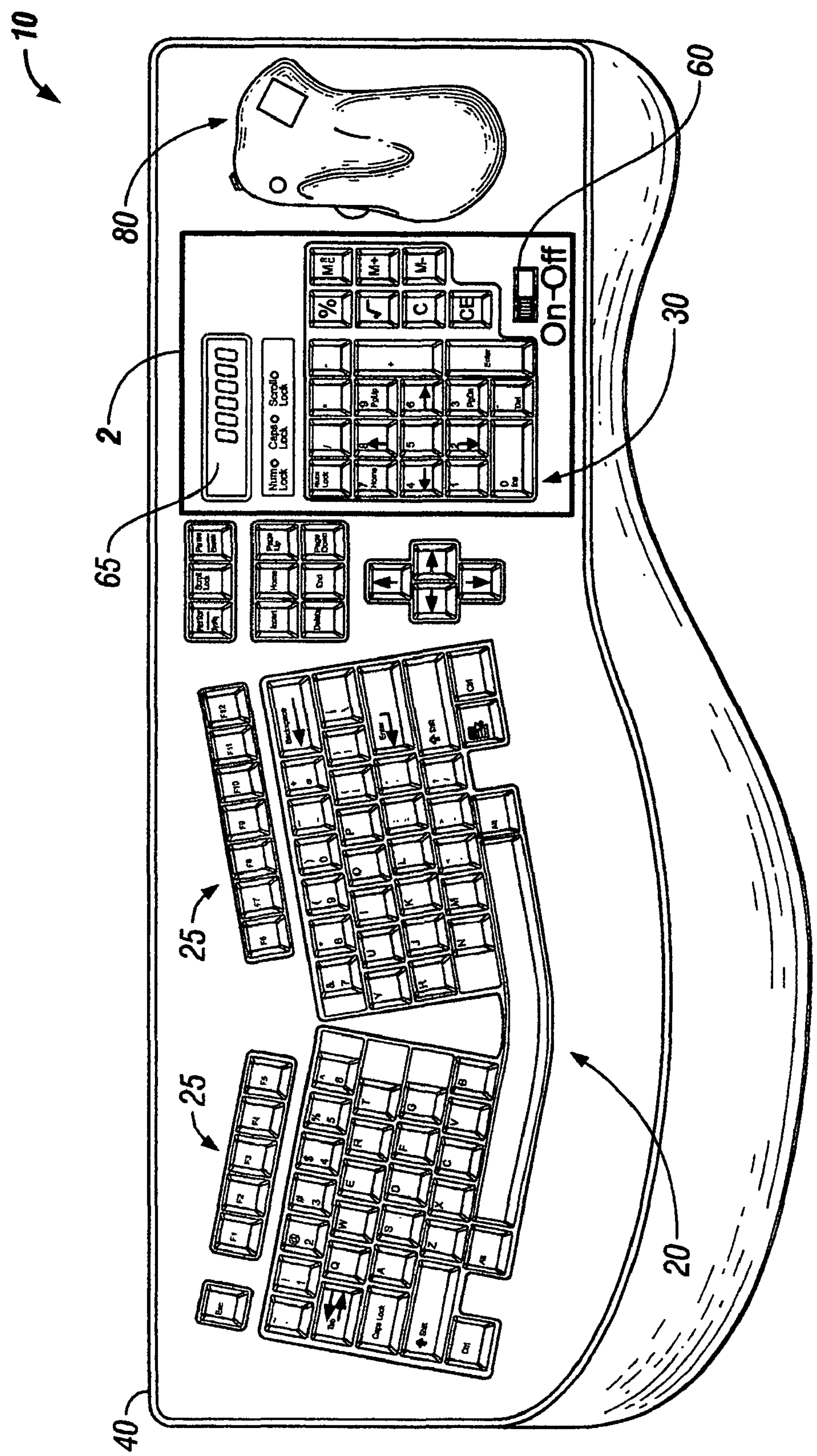
FIG. 1B illustrates an ergonomic keyboard design.

As shown in FIG. 1B, keyboard system (10) can be designed ergonomically. The ergonomic keyboard design angles the two halves of key section (20) to allow the elbows to rest in its natural position. The curved back end design of the keyboard provides additional support for the hands while in an operational form. The ergonomic design helps to prevent carpal tunnel syndrome.

Figure 4:
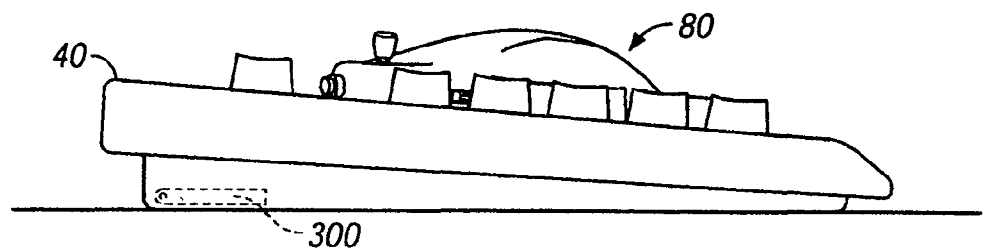
FIGS. 4, 4A, 5A, 5B illustrate the operation of the lever positioned underneath the keyboard.
Figure 4A:
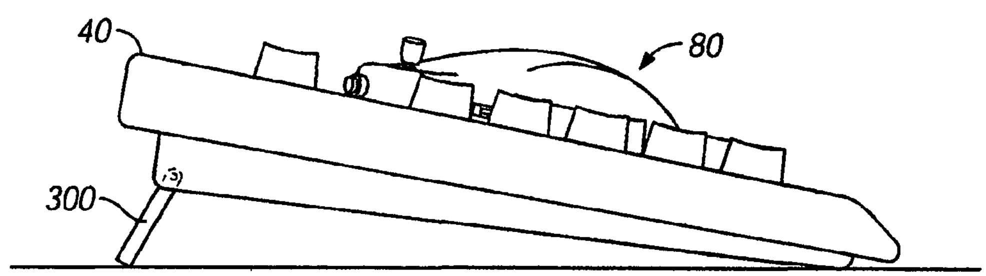
Figure 5:
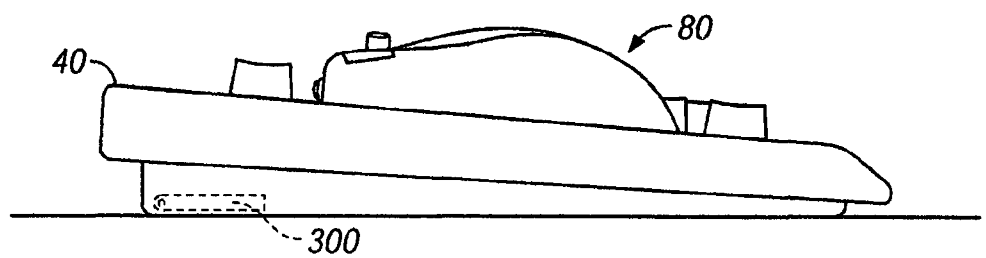
Figure 5A:
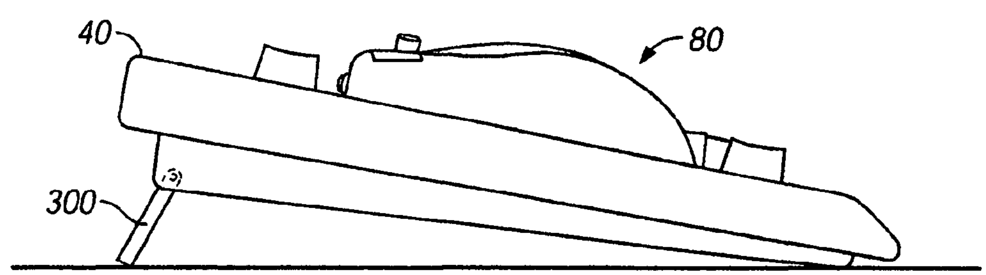

Referring to FIGS. 4A, 5A, 4B, and 5B there is shown keyboard system (10) in a flat position and an inclined position respectively. As depicted in FIG. 4B and 5B, lever (300) extends to lift keyboard system (10) in an inclined position.

Figure 1C:
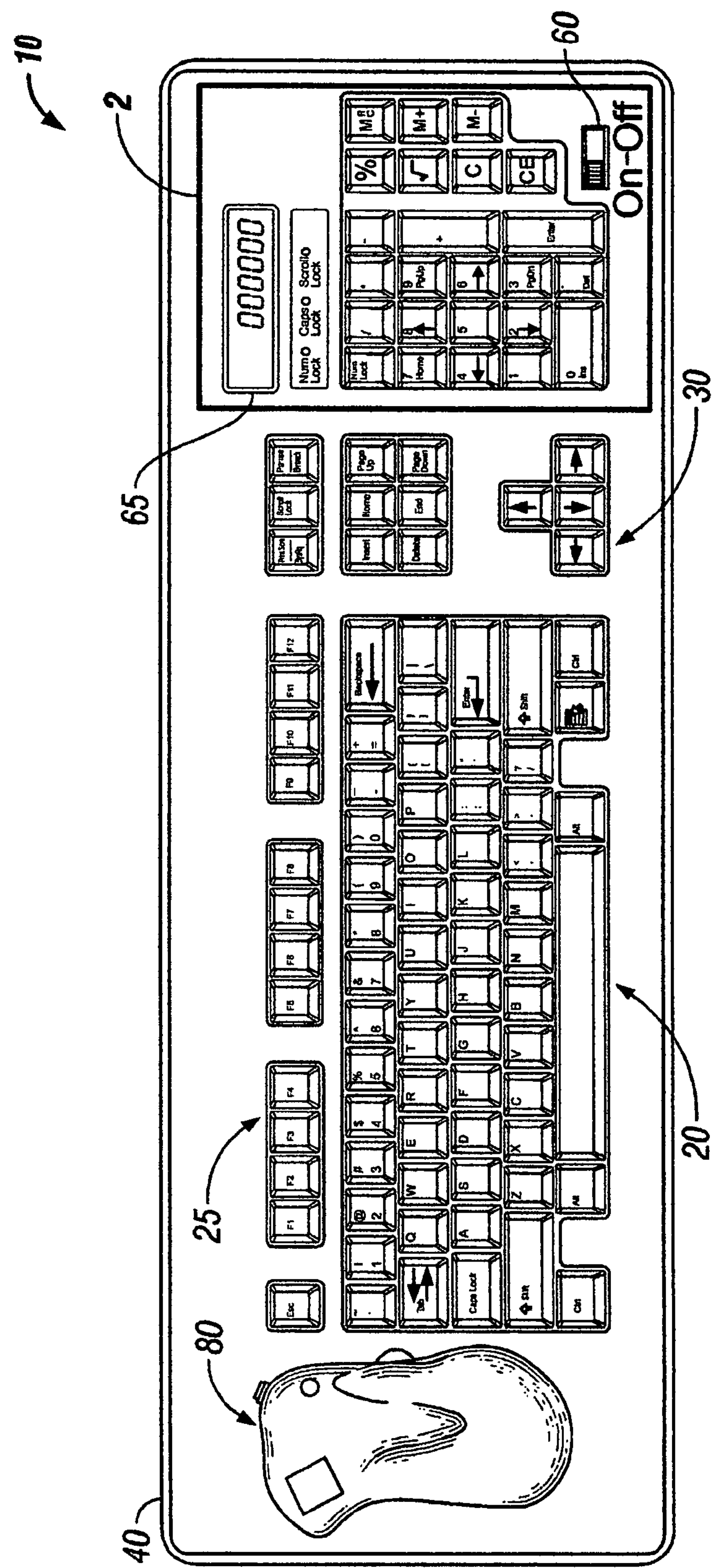
FIG. 1C illustrates the left-handed mouse.
Figure 3:
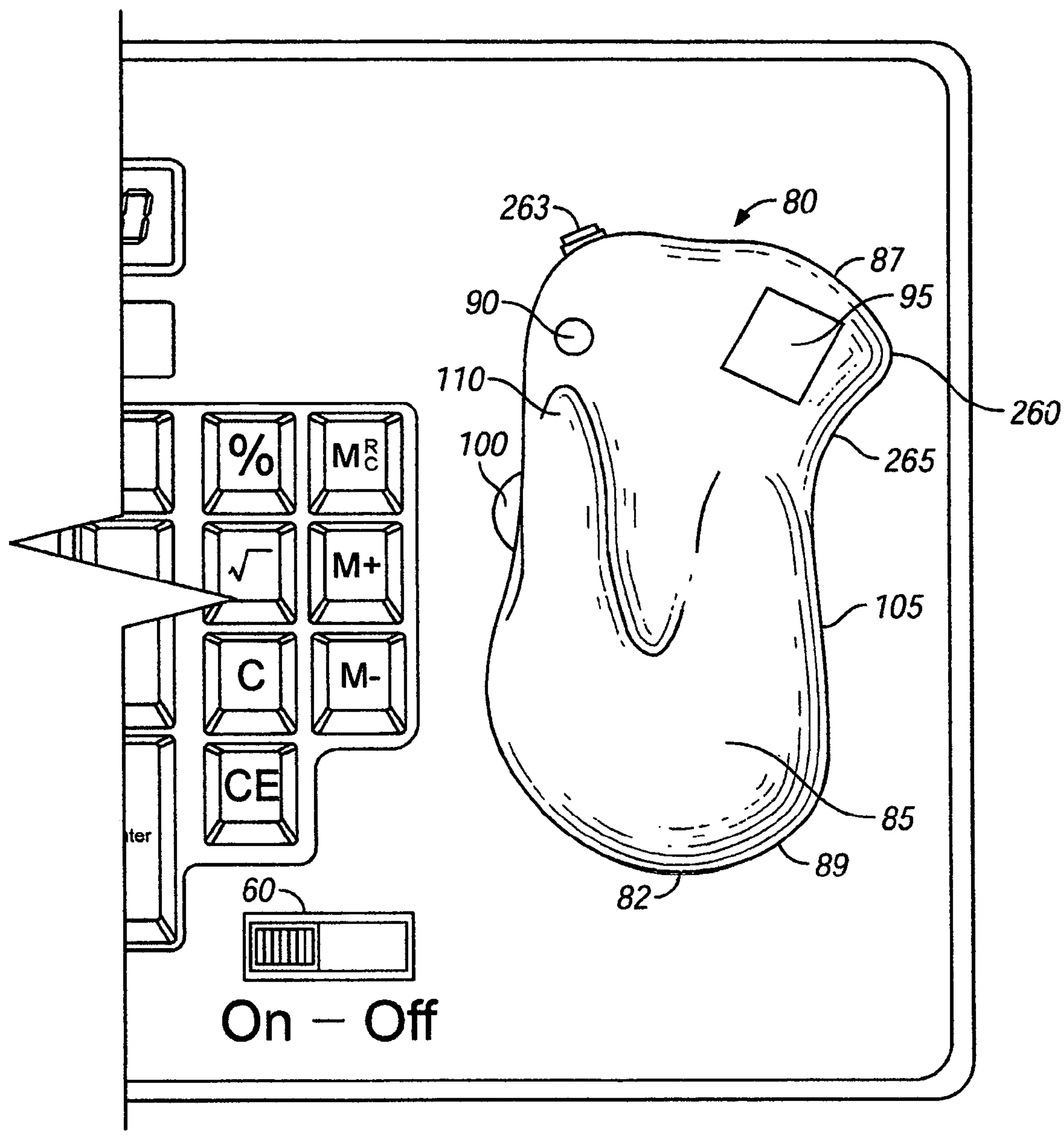
FIG. 3 is an exploded view of the integrated mouse of the keyboard system.

The keyboard system (10) can further comprise an ergonomic integrated pointing device for a right handed person as in FIG. 1 or a left handed person as in FIG. 1C. As depicted in FIG. 1, the integrated pointing device is an integrated mouse (80). Referring to FIG. 3, mouse (80) has a casing defined by an upper surface (82) and a flat bottom surface area (85). In the illustrated embodiment, mouse (80) is located to the far right of the housing (40) next to the numeric key section (30). Bottom surface area (85) is generally flat and integrated into the housing (40). Upper surface area (82) has substantially an ellipsoid shape and is dimensioned to fit within the hand and configured to be gripped by the hand. At the vertex of upper surface area (82) is slightly raised crown area (85) which is contoured to accommodate the inner palm region of the hand when the hand is place in an operational mode on the mouse.

Upper surface area (82) further includes a front section (87) and back section (89). Front section (87) extends and curves in a forward direction from crown area (85) to the frontal curved edge of the upper surface (82). Back section (89) extends and curves in a downward direction from crown (85) to the back curved edge of upper surface area (82). As shown, the back curved edge of upper surface area (82) is contoured to accommodate the distance of the lower palm region of the hand when the hand is place in an operational mode on the mouse. The lower curved back fans outward more than the traditional mouse to accommodate the contour of the lower palm region when the hand is placed in an operational mode on the mouse.

The integrated mouse (80) further comprises a navigation stick (90) for generating precise cursor control movement key signals. Navigation stick (90) is positioned on the top left corner of the front section (87) of upper surface area (82) below the index finger, and extends vertically upward a short distance above the upper surface area (82). A cap cover encompasses navigation stick (90). Cup (92) is defined by a recess situated within the cap at the top of navigation stick (90). Cup (92) is contoured to accommodate the tip of the index finger. Additionally, the navigation stick (90) is configured to generate left click key signals when depressed downward. In operation, the tip of the index finger would be placed within cup (92). Then, navigation stick (90) would be depressed downward.

The upper surface area (82) further comprises an index finger rest (105) extending downward from the navigation stick (90) to crown area (85). The index finger rest (105) further comprises a second raised section contoured to accommodate the area underneath the index finger. The navigation stick (90) is positioned above the index finger (105) to allow the index finger to operate navigation stick (90) in a natural position.

Typically, by moving the mouse on the surface, the user controls an on-screen cursor. There is no define limits to the mouse's movement and the mouse placement does not map directly to a direct specific screen location. With the present invention, the mouse does not have a tracking ball. Navigation stick (90) is used to provide precise on-screen cursor control movement. In use, when the navigation stick (90) is moved up, down, left, and right, the cursor on the screen moves up, down, left, and right. With the present inventor, the cursor does not move relentlessly on the screen. The user controls precisely where on the screen the cursor moves. Additionally, in some embodiments cursor can be controlled to move diagonally.

The integrated mouse (80) further comprises a right click button (95) configured to generate right click key signals for application programs or system programs executing in the digital computer. Right click button (95) is positioned on the top right corner of the front section (87) of upper surface area (82) near the middle finger. Thus, right click button (95) can be operated by the middle finger which relieves the index finger to control the operation of the navigation stick (90).

The integrated mouse (80) further comprises a scroll button (100) configured to generate screen scroll movement key signals for application programs or system programs executing in the digital computer. Scroll button (100) is positioned on the left side of the upper surface area (82) for operation by the thumb. Scroll button (100) can be oriented vertically or horizontally along the left side.

Scroll button (100) can be used to implement a screen jump capability. When scroll button (100) is depressed, the cursor moves to the center of the computer screen. If scroll button (100) is depressed simultaneously with navigation stick (90) being moved to the left, the cursor moves to the far left of the computer screen. If scroll button (100) is depressed simultaneously with navigation stick (90) being moved to the right, the cursor moves to the far right of the computer screen. If scroll button (100) is depressed simultaneously with navigation stick (90) being moved downward, the cursor moves to the bottom of the computer screen. If scroll button (100) is depressed simultaneously with navigation stick (90) being moved upward, the cursor moves to the top of the computer screen. If scroll button (100) is depressed simultaneously with navigation stick (90) being moved diagonally, the cursor moves diagonally along of the computer screen.

The right side of the integrated mouse (80) of the present invention further comprises a small frontal lobe (260) protruding from the upper edge of the right side. The lobe transitions into a sloping curvature support rest member (265). The curvature in the right side extends from lobe (260) to near the crown area (85). The support rest member (265) is contoured to accommodate the area underneath the ring finger and the little finger.

The left side of integrated mouse (80) further comprises a small lobe (270) protruding from the lower edge of the left side. The lobe (270) transitions into a sloping curvature thumb rest member (275). The curvature extends upward from lobe (270) to the scroll button (100). The thumb rest member (270) is contoured to accommodate the area underneath the thumb as well as the palm region under the thumb.

Figure 3A:
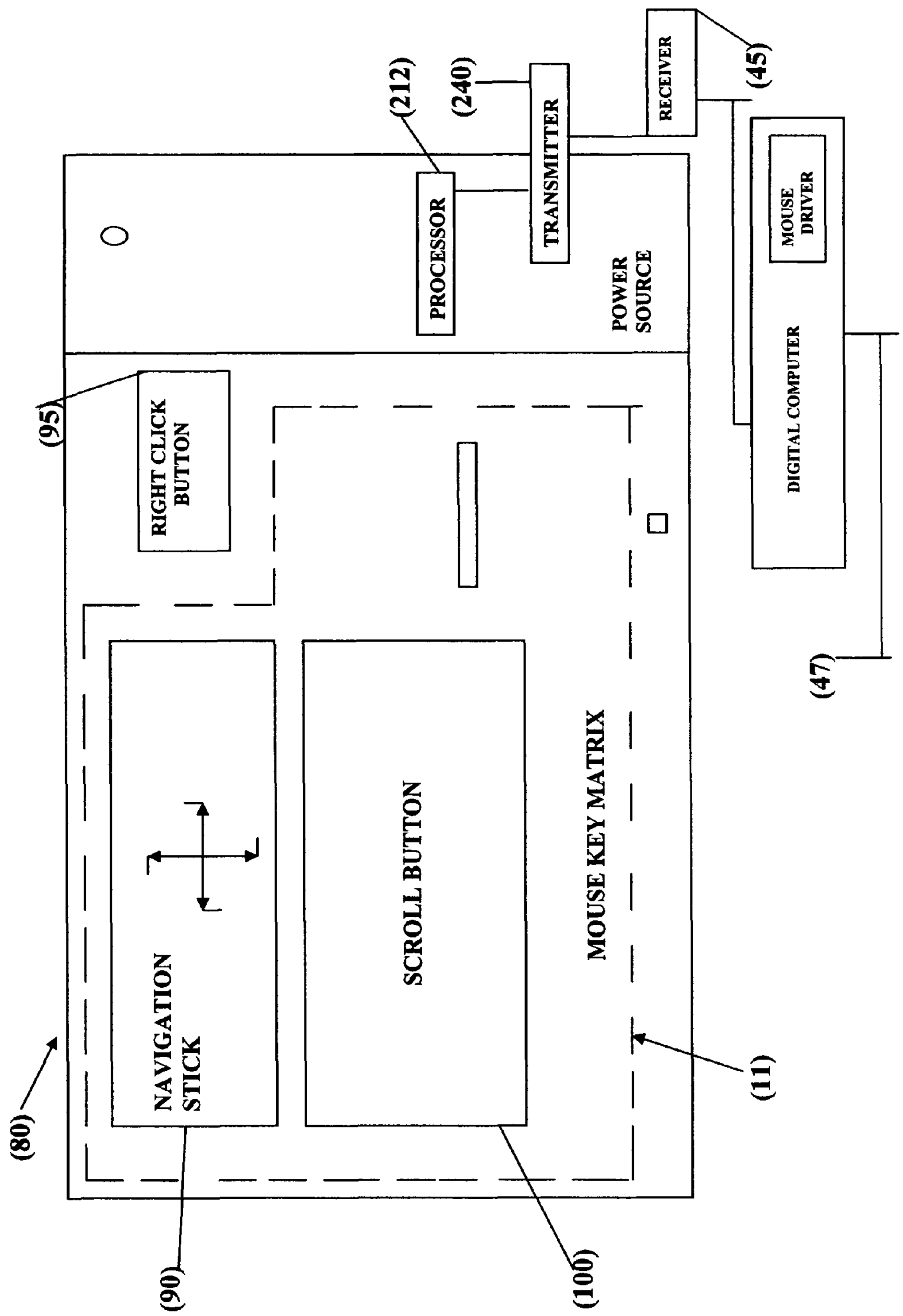
FIG. 3A illustrates an embodiment of an internal configuration of the integrated mouse of the present invention.

Referring to FIG. 3A there is shown an illustration of one embodiment of the internal configuration of mouse (80). Key matrix (200) supports the navigation stick (90), right click button (95), the scroll key button (100). The key matrix (200) is a grid of circuits lying underneath navigation stick (90), right click button (95), and the scroll key button (100). Underneath navigation stick (90), right click button (95), the scroll key button (100) the circuit is broken. When a key is pressed, the circuit is connected allowing a tiny amount of current to flow. Mouse (80) can have a processor (212) that has the capability of continuously monitoring the flow of current in the key matrix (212). When processor (212) notices a key current flow, processor (212) determines the location of the key and transmits the appropriate numeric code to the digital computer via transmitter (240). Transmitter (240) can communicate with receiver (45). Mouse (80) can also be configured to use a separate receiver. However, mouse (80) can also be configured to use transmitter (40) illustrated in FIG. 1A.

Figure 3B:
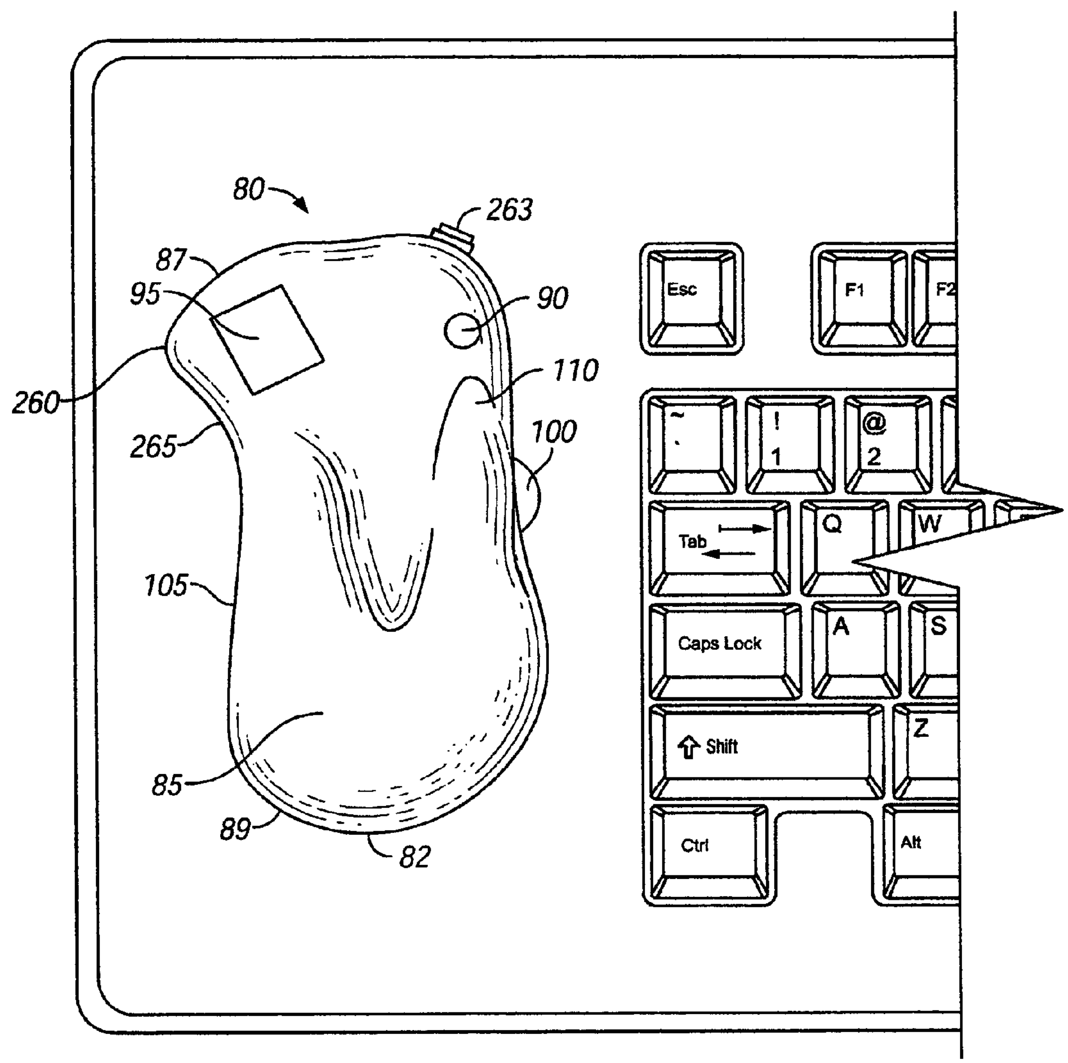
FIG. 3B illustrates the left handed mouse.

Referring to FIG. 3B, there is shown an illustration of one embodiment of a left handed mouse. In this embodiment, the position of the button components (i.e. the navigation stick (90), right click button (95), and scroll button (100)) of the mouse are swapped. Additionally on the keyboard, the mouse is positioned on the left hand side to accommodate a left handed person. However, the mouse functions the same.

Referring to FIG. 3, there is shown a wireless remote control button (263) is situated in front of the mouse. In one aspect of the present invention, when remote control button (263) is depressed, processor (212) (in FIG. 3A) detects the depression key signal and generates an infrared light. A sensor in the computer would detect the infrared light and automatically boot up the operating system of the digital computer.

What is claimed is:

1. A keyboard system for a digital computer, the keyboard system comprising: a housing defined by a top surface area and a lower surface area, the upper surface area having a keyboard section, a function key section, a stationary mouse, and a numeric key section cooperatively arranged on the top surface area of the housing; the stationary mouse ergonomically designed to support the hand in a natural position while in use and being disposed to the far right of the housing for a right handed person or being disposed to the far left of the housing for a left handed person; the keyboard section having keys for generating key signals, the keys being substantially arranged in a standard QWERTY or DVORAK typewriting key format; the function key section having keys configured to generate application or system specific key signals; the numeric key section having keys configured to generate numeric key signals; a communication means for transmitting the generated key signals of to the digital computer; a switch configured to switch the numeric key section between a keyboard mode and a calculator mode; a small display screen operationally mounted on the top surface of the housing near the numeric key section; when the switch is in the keyboard mode, the key signals generated by the numeric key section are transmitted to the digital computer; when the switch is in the calculator mode, a local calculator driver processes the key signals generated by the numeric key section and displays the results on the display screen; and a power source for generating an electrical current; and;

a stationary mouse for a right handed person being disposed to the right of the numeric key section and having a casing defined by an upper surface, a left side, a right side, and a flat bottom surface area; the upper surface area dimension to fit within the user's hand; the upper surface area including a vertex point, a front section and a back section; a raised crown area located at the vertex point of the upper surface area; the front section being curved and extending forward from the crown area to a front curved edge, the back section being curved and extending backward from the crown area to a back curved edge which is dimensioned to accommodate the length of the lower palm region while the user's hand is in an operating position on the mouse; a navigation stick configured to generate precise screen cursor control movement key signals, without utilizing a track ball disposed within the bottom surface area and a supporting left mouse button, the navigation stick positioned in the upper left corner of the forward section for operation by the index finger, the navigation stick extending vertically upward a slight distance above the top surface area; the navigation stick configured to generate left click key signals for application or system programs when depressed in a downward direction; a right click button configured to generate right click key signals for application programs or system programs, the right click button positioned in the upper right corner of the forward section for operation by the middle finger; and a scroll button configured to generate screen scroll movement key signals for application programs or system programs, the scroll button positioned laterally within a curved recessed portion disposed on the left side of the casing within for operation by the right thumb while in a natural position.

2. The keyboard system of claim 1 wherein the communication means further comprises: a transmitter and a receiver in communication through a wireless means; the transmitter operationally configured within the housing to send the key signals for the section to the receiver; and the receiver operationally connected to a communication port of the digital computer, the receiver operationally configured to receive the key signals sent by the transmitter.

3. The keyboard system of claim 2 wherein the transmitter and the receiver communicate through infrared communication signals.

4. The keyboard system of claim 2 wherein the transmitter and the receiver communicates through radio communication signals.

5. The keyboard system of claim 1 wherein the display screen further comprises a flat LED panel operationally mounted upon the top surface area of the housing.

6. The keyboard system of claim 1 wherein the display screen further comprises a flat LCD panel operationally mounted upon the top surface area of the housing.

7. The keyboard system of claim 1 wherein the display screen is operationally mounted to the top surface area of the housing at a predetermined angled position for viewing the display screen.

8. The keyboard system of claim 1 wherein the display further comprises: a top edge; and a cover hingedly connected to the top edge such that the cover can transverse between an opened and a closed position.

9. The keyboard system of claim 1 wherein the function keys is configured to generate screen control key signals.

10. The keyboard system of claim 1 wherein the numeric key section further comprises a plurality of special calculator keys.

11. The keyboard system of claim 1 wherein a clock mechanism for displaying time on the display screen when the switch is not in the calculator mode.

12. The keyboard system of claim 1 further comprising: at least one lever hingedly connected underneath the housing at a strategic position such that the lever can be traversed between an opened and closed position; and while in the opened position, the housing can be elevated at an inclined position to allow viewing by a user.

13. The keyboard system of claim 1 wherein the navigation stick further comprises: a cup defined by a recess located on the top of the navigation stick; and the recess dimensioned to accommodate the tip of the index finger.

14. The keyboard system of claim 1 wherein the scroll button is vertically oriented.

15. The keyboard system of claim 1 wherein the scroll button is horizontally oriented.

16. The keyboard system of claim 1 wherein the navigation stick is configured to generate left, right, up, and down key signals for screen cursor movement.

17. The keyboard system of claim 16 wherein the navigation stick is configured to generate diagonal key signals for screen cursor movement.

18. The keyboard system of claim 1 wherein the communication means further comprises: a transmitter and a receiver; the transmitter operationally configured within the casing to send the key signals generated by the mouse to the receiver; and the receiver operationally connected to a communication port of the digital computer, the receiver operationally configured to receive the key signals sent by the transmitter.

19. The keyboard system of claim 18 wherein the transmitter and the receiver communicate through infrared communication signals.

20. The keyboard system of claim 18 wherein the transmitter and the receiver communicates through radio communication signals.

21. The keyboard system of claim 1 wherein the casing further comprises: an index finger rest defined by a raised section extending from the navigation stick to the crown; and the raised section contoured and positioned to accommodate the area underneath the index finger while the user's hand is in an operational mode on the mouse.

22. The keyboard system of claim 1 wherein the right side of the upper surface area further comprises: a small lobe protruding from the upper edge of the right side; the lobe transitioning into a sloping curvature support rest member, the curvature extending downward from the lobe to near the crown; and the support rest member dimensioned to accommodate the area underneath the ring finger and the little finger while the user's hand is in an operational mode on the mouse.

23. The keyboard system of claim 1 wherein the left side of the upper surface area further comprises: a small lobe protruding from the lower edge of the left side; the lobe transitioning into a sloping curvature thumb rest member, the curvature extending upward to the scroll button; and the thumb rest member dimensioned to accommodate the area underneath the thumb as well as the palm region below the thumb, while the user's hand is in an operational mode on the mouse.

24. The keyboard system of claim 1 further comprising: a cursor screen jump mechanism for jumping to a predetermined screen location; and the jump mechanism integrated into the operation of the scroll button.

25. The keyboard system of claim 1 wherein the housing further comprises:

ergonomically design wrist pads situated at the peripheral edge of the housing; the wrist pads contoured to support the wrist in their natural position while in an operational mode on the keyboard; and the keyboard section angled to accommodate the hands while in their natural position while in an operation mode on the keyboard.

26. The keyboard system of claim 1 further comprising: a remote control mechanism strategically placed on the upper surface of the casing of the mouse or the top surface of the housing of the keyboard; the mechanism operationally configured to remotely communicate with the digital computer such that the computer can be remotely booted into operation.

27. The keyboard system of claim 1 further comprising: a stationary mouse for a left handed person situated to the far left of the keyboard and having a casing defined by an upper surface, a left side, right side, and a flat bottom surface area; the upper surface area including a vertex point, a front section and a back section; the upper surface area dimensioned to fit within the hand of a user; a raised crown area located at the vertex point contoured to accommodate the inner palm region of the hand; the front section being curved and extending forward from the crown area to a front curved edge, the back section being curved and extending backward from the crown area to the back curved edge, the back curved edge contoured to accommodate the length of the lower palm region while the user hand is in an operating position on the mouse; a navigation stick configured to generate precise screen cursor control movement key signals, the navigation stick positioned in the upper right corner of the forward section for operation by the index finger, without utilizing a track ball disposed within the bottom surface area and a supporting left mouse button, the navigation stick extending vertically upward a slight distance above the top surface area; the navigation stick configured to generate left click key signals for application or system programs when depressed in a downward direction; a right click button configured to generate right click key signals for application programs or system programs, the right click button positioned in the upper left corner of the forward section for operation by the middle finger. A scroll button configured to generate screen scroll movement key signals for application programs or system programs, the scroll button positioned laterally within a curved recessed portion disposed on the right side of the casing for operation by the left thumb while in a natural position; a power source for generating an electric current; and a communication means for transmitting the generated key signals of to the digital computer.

* * * * *